United States Patent [19]
Rockstroh et al.

[11] Patent Number: 5,747,769
[45] Date of Patent: May 5, 1998

[54] METHOD OF LASER FORMING A SLOT

[75] Inventors: Todd J. Rockstroh; John M. Crow, both of Maineville; Ching-Pang Lee; James D. Risbeck, both of Cincinnati, all of Ohio

[73] Assignee: General Electric Company, Cincinnati, Ohio

[21] Appl. No.: 555,653

[22] Filed: Nov. 13, 1995

[51] Int. Cl.$^6$ ................................................ B23K 26/00
[52] U.S. Cl. ........................... 219/121.71; 219/121.69; 416/97 R
[58] Field of Search .................... 219/121.68, 121.69, 219/121.7, 121.71, 121.72; 60/261; 416/97 R

[56] References Cited

U.S. PATENT DOCUMENTS

| | | | |
|---|---|---|---|
| 4,048,464 | 9/1977 | Gale et al. | 219/121.85 |
| 4,197,443 | 4/1980 | Sidenstick | 219/69.15 |
| 4,564,737 | 1/1986 | Burke et al. | 219/121.68 |
| 4,670,639 | 6/1987 | Behn | 219/121.69 |
| 4,676,719 | 6/1987 | Auxier et al. | 416/97 R |
| 4,762,464 | 8/1988 | Vertz et al. | 416/97 R |
| 5,096,379 | 3/1992 | Stroud et al. | 416/97 R |
| 5,181,379 | 1/1993 | Wakeman et al. | 60/261 |
| 5,223,692 | 6/1993 | Lozier et al. | 219/121.72 |
| 5,418,345 | 5/1995 | Adamski | 219/121.71 |
| 5,458,461 | 10/1995 | Lee et al. | 416/97 R |
| 5,511,946 | 4/1996 | Lee et al. | 416/97 R |
| 5,641,416 | 6/1997 | Chadha | 219/121.69 |

FOREIGN PATENT DOCUMENTS 6-170563  6/1994  Japan.

OTHER PUBLICATIONS

Yilbas, B.S.Z., "Parameters Affecting Hole Geometry in Laser Drilling of Nimonecs 75", SPIE, vol. 744, Lasers in Motion for Industrial Applications (1987), p. 87.
Yeo et al, "A Technical Review of the Laser Drilling of Aerospace Materials," Journal of Materials Processing Technology, 42 (1994), pp. 15–49; accepted 19 Jul. 1993.
Kitao et al, "Nd–YAG Laser Machining Technology for Cooling Passage Holes of High Temperature Gas Turbine Parts," Bulletin of GTSJ, Mar. 1, 1995, pp. 34–39.
Roos, "LaserDrilling with Different Pulse Shapes," J. Appl. Phys., Sep. 1980, pp. 5061–5063.
Murphy, "Laser Drilling: Capabilities and Trends," Lasers and Applications, Mar. 1987, pp. 59–62.

*Primary Examiner*—Geoffrey S. Evans
*Attorney, Agent, or Firm*—Andrew C. Hess; Patrick R. Scalon

[57] ABSTRACT

A method for forming a slot in a metal component having first and second opposite surfaces utilizes a first laser beam having a pulse rate and power to vaporize the metal. The laser beam is traversed across the first surface at a feed rate so that each beam pulse vaporizes the component metal at a spot. The laser beam pulse rate and feed rate are effective so that successive spots do not substantially overlap each other. The laser beam is traversed in repeated steps in a series of passes so that the spots collectively form a continuous slot to a depth below the first surface. In a subsequent step, a second laser beam is positioned in the slot to drill a hole through a base of the slot, with the second laser beam being repositioned to drill a plurality of the through holes spaced apart from each other along the length of the slot.

20 Claims, 4 Drawing Sheets

METHOD OF LASER FORMING A SLOT

BACKGROUND OF THE INVENTION

The present invention relates generally to machining aerospace components, and, more specifically, to laser machining thereof.

A gas turbine engine includes a compressor for compressing air which is mixed with fuel and ignited for generating hot combustion gases in a combustor, with energy being extracted from the gases in a turbine disposed downstream of the combustor for powering the compressor and providing output power. Various components bound the hot combustion gases and therefore are typically cooled during operation for obtaining a useful life thereof. One conventional cooling arrangement includes film cooling holes which are typically inclined at an acute angle through the component for receiving a portion of the compressed air on one side thereof which passes through the holes to form a film of cooling air along the opposite side of the component which provides effective film cooling of the component during operation. Film cooling holes are typically found in combustion liners, turbine nozzle vanes and blades, turbine shrouds, and various shields requiring effective cooling.

In a recent development, an improved film cooling arrangement has been made wherein an elongate blind slot is formed in a surface of the component to be cooled, with a plurality of holes being formed through the component at the base of the slot for feeding cooling air into the slot. From the slots, the cooling air is discharged along the entire longitudinal extent thereof for creating an improved continuous cooling air film for more effectively cooling the component.

Conventional processes exist for forming through holes in gas turbine engine components wherein holes may be drilled using an industrial laser or electrical discharge machining (EDM). In conventional laser drilling, a suitably powered laser beam is maintained at a desired location as the beam vaporizes metal until the through hole is completed. The laser, such as a Nd:YAG laser, is typically operated at a suitable pulse rate, with each pulse vaporizing a portion of the metal until the through hole is completed. The configuration of the hole as it is being formed varies considerably during the drilling process but is typically irrelevant since only the final configuration of the through hole is relevant for creating an effective film cooling hole. Industrial lasers are also used for cutting a metal component by firstly drilling a hole therethrough and then slowly traversing the laser beam to continue cutting the component as desired.

However, attempting to form the desired blind slot into the component for the improved film cooling slots, creates significant problems. The slot is relatively long in its longitudinal direction, and has a significant number of longitudinally spaced apart through holes which must be accurately aligned therewith for providing effective film cooling. The sidewalls and bottom of the slot should be preferably relatively smooth for aerodynamic reasons for efficient film cooling operation. And, the walls and bottom should also be sufficiently smooth to avoid undesirable stress concentrations for limiting maximum stress in the component during operation for ensuring an effective life.

In the typical YAG pulse laser, each pulse has an amplitude and a finite duration, each typically having a plus or minus 5% variation in value. By integrating overtime the power of each pulse, the amount of energy in each pulse may be determined which can have about a plus or minus 20% variation based on the worst case combination of the plus and minus 5% variations on pulse amplitude and duration. This substantial energy variation means that the amount of metal vaporized per pulse varies significantly from pulse to pulse, with the corresponding aperture being formed by consecutive pulses varying significantly in configuration during the process. This significant pulse energy variation is typically not a major concern for drilling or laser cutting, since the objective is to form a through hole or cut, with the configuration of the in-process hole or cut being immaterial.

However, this substantial energy variation is quite significant for attempting to form blind holes or slots which do not pass completely through the metal component. Accordingly, attempting to use a laser in conventional practice to drill a blind hole, and then continue the process for forming an elongate blind slot, will result in a slot having a substantial variation in width, depth, and surface contour. The resulting jagged contour blind slot would be undesirable for aerodynamic and strength reasons. The jagged contour decreases the ability to form a substantially smooth and uniform cooling air film, and the jagged bottom of the slot could undesirably decrease the effective strength of the base portion of the component below the slot bottom. Turbine film cooled components are typically relatively thin in overall thickness, which requires the accurate placement and depth of the blind slot therein. If the remaining base material below the slot is too thin, the components may have undesirably low strength either reducing its useful life or requiring rejection of the component during the manufacturing process.

Alternatively, conventional EDM machining may be used for accurately forming the blind slot, followed in turn by forming the required through holes in the slot again using conventional EDM machining or conventional laser drilling. These two processes would typically be performed in two separate and distinct steps utilizing refixturing the component in the same or different machines to form the differently configured blind slot and through holes in the component. Refixturing presents the additional problem of maintaining accurate alignment between the blind slot and the through holes therein. Accordingly, the resulting manufacturing process would be relatively complex and costly since a typical component such as a turbine blade, turbine vane, or combustion liner has a substantial number of film cooling through holes, with the corresponding large number of blind slots associated therewith.

SUMMARY OF THE INVENTION

A method for forming a slot in a metal component having first and second opposite surfaces utilizes a first laser beam having a pulse rate and power to vaporize the metal. The laser beam is traversed across the first surface at a feed rate so that each beam pulse vaporizes the component metal at a spot. The laser beam pulse rate and feed rate are effective so that successive spots do not substantially overlap each other. The laser beam is traversed in repeated steps in a series of passes so that the spots collectively form a continuous slot to a depth below the first surface. In a subsequent step, a second laser beam is positioned in the slot to drill a hole through a base of the slot, with the second laser beam being repositioned to drill a plurality of the through holes spaced apart from each other along the length of the slot.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
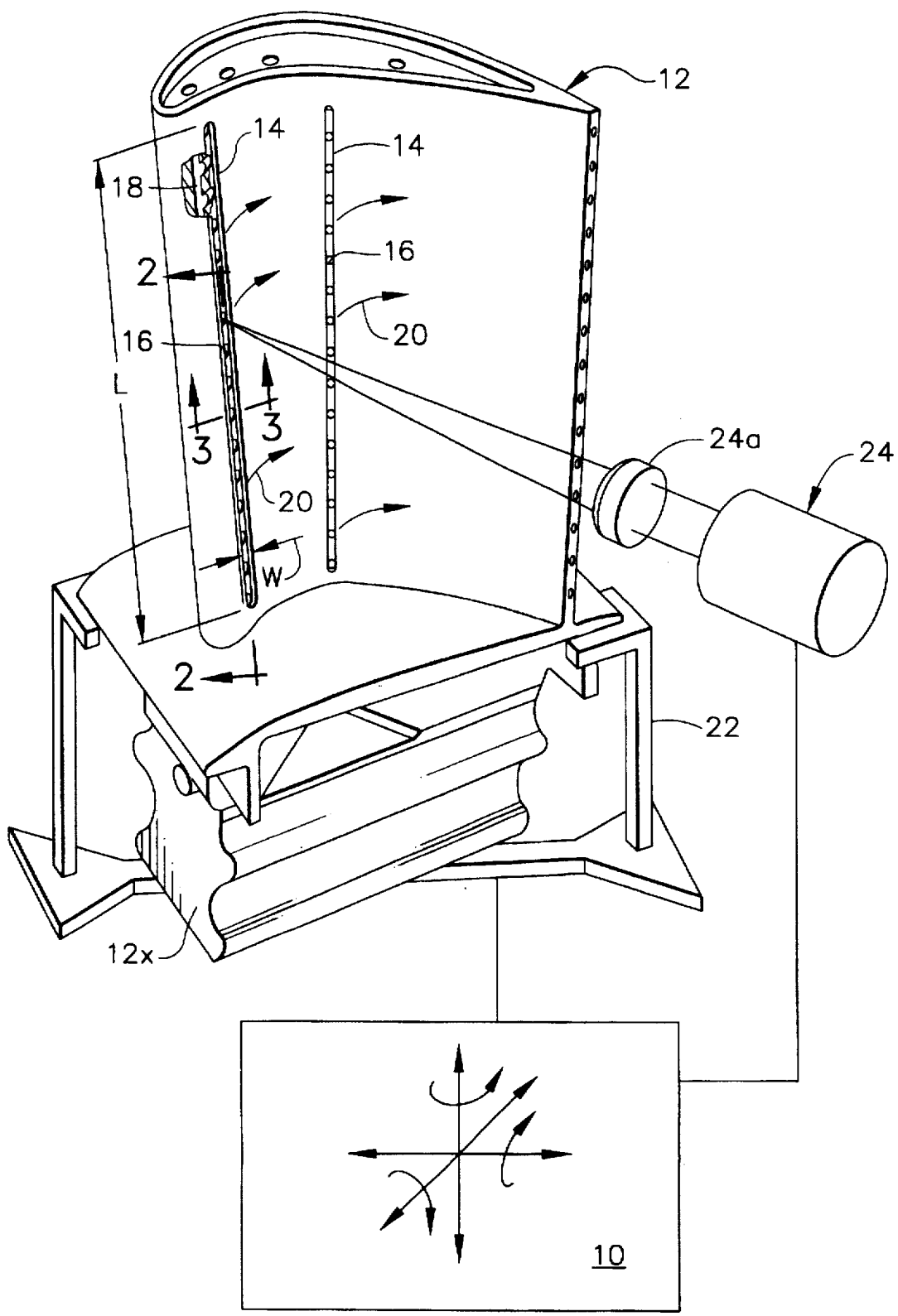
FIG. 1 is a schematic representation of an exemplary multi-axis machine supporting a component such as a gas turbine engine rotor blade in a corresponding fixture, and a laser beam for machining slots and holes in the component in accordance with one embodiment of the present invention.

Illustrated schematically in FIG. 1 is a conventional multi-axis machine tool 10 which may be conventionally configured for providing three to eight axes of motion of a metal component 12, such as the airfoil portion of a gas turbine engine turbine rotor blade for example. In the exemplary embodiment illustrated, the airfoil 12 is generally hollow and is integrally joined to a conventional dovetail and platform 12x. The airfoil 12 is conventionally configured with leading and trailing edges, and a concave pressure side, and a convex suction side extending therebetween. The airfoil 12 is otherwise conventional except for a plurality of elongate, blind slots 14 extending generally radially therein and having a plurality of longitudinally or radially spaced apart through holes 16 therein which are disposed in flow communication with an inner cavity or channel 18. The channel 18 is conventionally provided with film cooling air 20 during operation, as shown by the flow arrows illustrated in FIG. 1, which is discharged from the interior of the airfoil 12 through the several holes 16 to feed the slot 14 and form a longitudinally or radially continuous film of cooling air for cooling the airfoil 12 during operation against the heat of hot combustion gases flowable thereover.

Although the film cooling slot 14 and the holes 16 supplying the cooling air 20 thereto are shown in the pressure surface of the airfoil 12, they may also be used on the suction surface thereof, or in any other component in a gas turbine engine or other structure subjected to a hot fluid such as the combustion gases for effecting film cooling of the components. For example, the slot 14 and hole 16 may be similarly configured in an otherwise conventional gas turbine engine combustion liner, turbine nozzle vane, turbine rotor shroud, or other components requiring improved film cooling.

In accordance with the present invention, it is desired to form or machine the slots 14 and through holes 16 in a relatively inexpensive, relatively fast, and relatively accurate process for reducing cost of manufacture since in a typical individual gas turbine engine component, there may be several slots 14 and a corresponding high number of holes 16, and a substantial number of the individual components must be formed.

As shown schematically in FIG. 1, the component 12 is suitably fixedly supported in a suitable fixture 22 shown schematically in the multi-axis machine 10 so that the component may be moved in the various degrees of movement of the machine 10, which may be typically three to eight translational and rotational axes of movement. The fixture 22 may take any conventional form for fixedly holding the component 12 during manufacturing. The machine 10 is in the form of a conventional computer numerical control (CNC) machine for providing accurate movement of the component 12 during the manufacturing process.

The machine 10 further includes a conventional industrial laser 24 suitably fixedly joined relative thereto. The laser 24 itself includes various components, such as a focusing lens 24a, and is conventional in configuration but operated in accordance with the present invention as further described hereinbelow. In accordance with the present invention, the laser 24 is operated in turn for both machining or forming the individual blind slots 14 and the corresponding rows of longitudinally spaced apart holes 16 in each of the slots 14 in a simple, inexpensive, and accurate manufacturing process. In the exemplary embodiment illustrated in FIG. 1, the laser 24 is preferably a conventional Nd:YAG laser configured in accordance with the present invention for machining in turn the slot 14 and the corresponding holes 16 therein.

Figure 2:
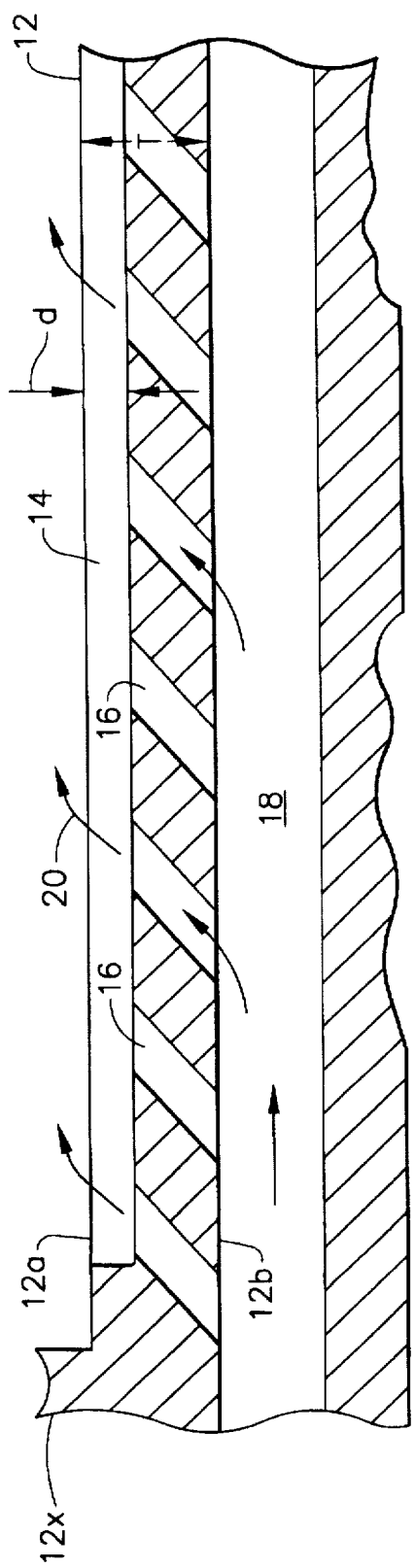
FIG. 2 is a sectional view of a portion of the airfoil of the turbine blade illustrated in FIG. 1 taken generally along line 2—2 through an exemplary slot formed therein.
Figure 3:
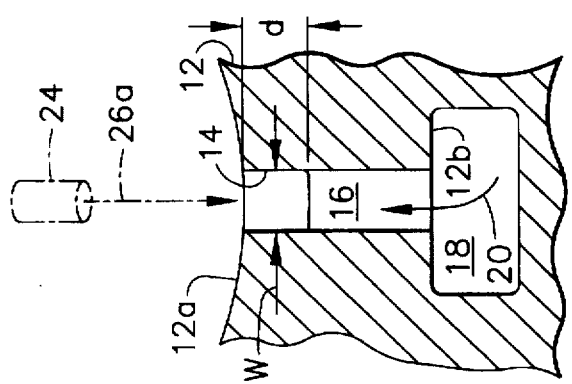
FIG. 3 is a sectional view through a portion of the airfoil slot illustrated in FIG. 1 and taken generally along line 3—3.

FIGS. 2 and 3 illustrate in more particularity an exemplary one of the slots 14 and the corresponding through holes 16 disposed in flow communication between the slot 14 and the interior channel 18 of the airfoil 12 in final form.

Since the present method is applicable to any suitable component in which it is desired to form the slots 14 and holes 16, the airfoil embodiment illustrated in the several Figures will simply be referred to herein as the component 12 which is typically a metal component formed of suitable aerospace grade superalloys which are conventionally known in the industry for use in turbine components. The component 12 in the exemplary form of the turbine blade airfoil comprises a wall having first and second generally parallel opposite surfaces 12a and 12b which are spaced apart from each other at a thickness T defined therebetween. In the exemplary embodiment illustrated in FIG. 2, the first surface 12a is an outer, pressure-side surface of the airfoil 12, with the second surface 12b being an inner surface of the airfoil which defines in part the channel 18 therein. The desired slot 14 to be formed in the component 12 has a resultant depth d below the first surface 12a and preferably has an axial cross-section as shown in FIG. 3, for example, which is generally U-shaped with a width W generally equal to the depth d in this exemplary embodiment. As shown in FIG. 1, the slot 14 may have any suitable longitudinal length L, which in the exemplary embodiment illustrated in FIG. 1 extends radially across the airfoil for substantially its entire radial extent. As shown in FIG. 2, the through holes 16 are preferably inclined at an acute angle relative to the longitudinal extent of the slot 14 for feeding the cooling air 20 longitudinally therein.

Figure 4:
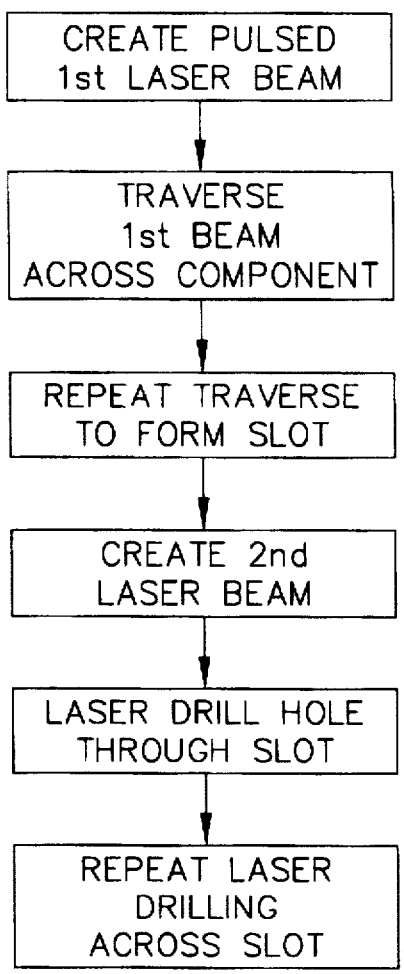
FIG. 4 is a flowchart representation of an exemplary process for forming the airfoil slot and through holes illustrated in FIGS. 1–3 in accordance with one embodiment of the present invention.
Figure 5:
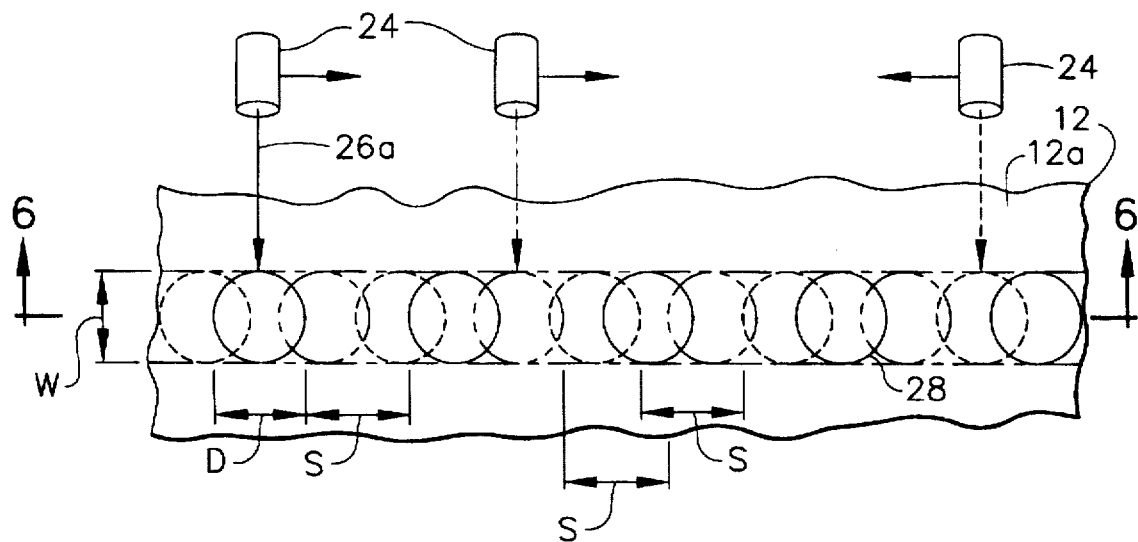
FIG. 5 is a schematic plan view representation of laser forming the airfoil slot illustrated in FIGS. 1–3.
Figure 6:
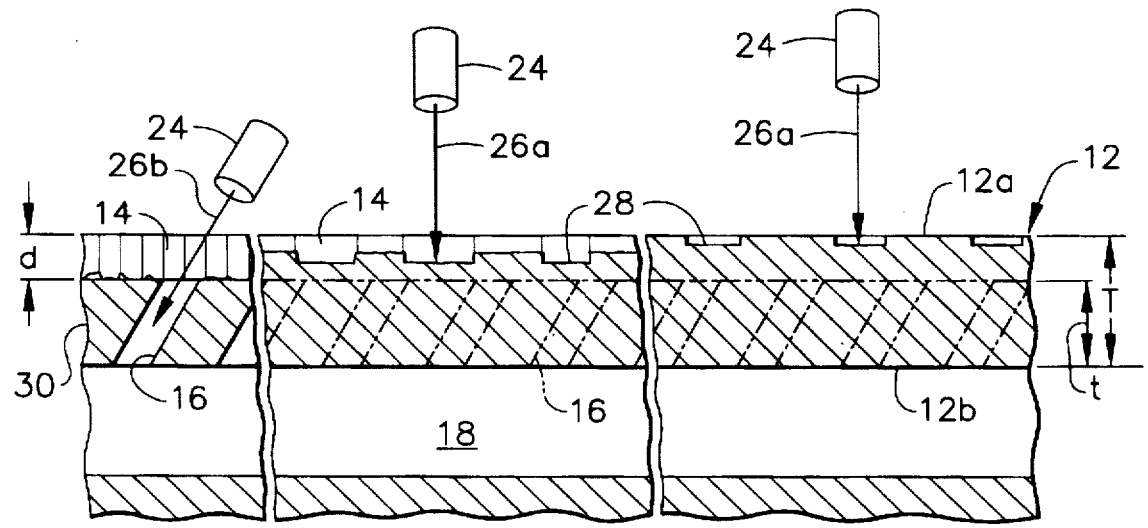
FIG. 6 is an elevational sectional view through the slot being formed in FIG. 5 and taken along line 6—6 to illustrate laser formation of the slot therein followed in turn by laser drilling of the through holes through the base material below the slot.

FIG. 4 illustrates in flowchart form an exemplary method for laser forming the slot 14 and in turn the corresponding holes 16 therein in accordance with one embodiment of the present invention, with FIGS. 5 and 6 illustrating schematically the process steps relative to the component 12. The component 12 is initially provided with relatively smooth first and second surfaces 12a,b for undergoing laser machining thereof in accordance with the present invention. The conventional laser 24 illustrated in FIG. 1 is firstly positioned adjacent to the first surface 12a at the location at which the slot 14 is desired. Although either the component 12 or the laser 24 may be moved relative to each other, in the exemplary embodiment illustrated in FIG. 1, the machine 10 is conventionally effective for moving the fixture 22 supported thereby for in turn positioning the component 12 relative to the laser 24 which remains stationary during the machining process. FIGS. 5 and 6 illustrate schematically the relative positioning of the laser 24 and the component 12 irrespective of which element is moved relative to the other.

The laser 24 is firstly operated in a slotting mode to effect or create a pulsed first laser beam 26a having a substantially uniform frequency or pulse rate and suitable power to vaporize the metal of the component 12. As shown in FIG. 5, the first beam 26a has a suitable diameter D where it projects onto the first surface 12a. The first beam 26a is then traversed, by suitably operating the machine 10, across the first surface 12a in the desired path, straight for example, at a substantially uniform feed rate so that each beam pulse vaporizes the metal of the component 12 at a corresponding spot 28 which forms a small impression or cavity in the first surface 12a.

Since the laser 24 may take any conventional form, it has corresponding conventional variation in its operating parameters. In the exemplary embodiment of the invention wherein the laser 24 is a Nd:YAG laser which has a pulse rate, pulse duration in time, and pulse power amplitude, the typical variation in pulse amplitude and duration is about plus or minus 5% each. The energy dissipated in each pulse may be obtained by integrating the pulse amplitude over time which will result in an energy variation per pulse of about plus or minus 20%. This relatively high pulse energy variation is accommodated in accordance with the present invention for ensuring the accurate formation of the slot 14 without unacceptable variations in depth d thereof and width W and with suitably acceptable surface finish thereof for acceptable aerodynamic performance.

In particular, the first beam 26a is traversed relative to the component 12 at a preselected feed rate in conjunction with a preselected pulse rate so that successive spots 28 do not substantially overlap each other which ensures that the pulse energy is not concentrated at any individual spot location from pulse-to-pulse in turn, and therefore the pulse energy may be averaged across the longitudinal extent of the slot 14. It is preferable in accordance with the present invention to therefore traverse the first beam 26a in a series of travelling passes back and forth over the location desired for forming the slot 14 so that the individual spots 28 collectively form the continuous slot 14 to the depth d below the first surface 12a, with the corresponding width W and desired length L.

In FIG. 5, a first pass of the first beam 26a is shown schematically as proceeding from left to right with successive spots 28 being shown in solid line spaced apart from each other at a suitable spacing distance S. A subsequent traverse or pass of the first beam 26a from right to left is illustrated in dashed line with the corresponding spots 28 again being spaced apart from each at the spacing S. And an exemplary subsequent pass from left to right is illustrated in phantom line with the corresponding spots 28 being also spaced apart from each other at the spacing S. By using multiple back and forth passes of the first beam 26a over the first surface 12a, and suitably selecting the pulse rate and the feed rate, successive spots 28 in turn do not substantially overlap each other and preferably are spaced apart from each other for spreading apart the pulse energy at the spots.

In a conventional drilling operation for example, successive pulses operate on the same spot, with the pulse energy thereof adding together for vaporizing the material at the common spot and drilling a hole through the material. This conventional drilling operation concentrates the laser energy and typically also enlarges the spot size greater than the nominal diameter of the pulse during operation due to the concentrated heat and its relatively large heat affected zone.

In contrast, the present invention is operated to prevent the concentration of pulse energy at any one spot by rapidly traversing the first beam 26a so that the pulse energy and corresponding spots 28 are spread apart laterally to distribute the energy. By forming the slot 14 using a series of passes of the first beam 26a, with the spots 28 eventually overlapping each other between successive passes and not in individual passes, the laser beam pulse energy may be distributed along the slot 14 and effectively averaged out thereacross. This effectively accommodates the large pulse energy variation discussed above which can be as large as about plus or minus 20% to nevertheless accurately form the slot 14. As shown in FIG. 5, since the pulse energy is being spread longitudinally along the slot 14, the resulting width W of the slot 14 is substantially equal to the diameter D of the individual spots 28. And, the longitudinal sidewalls of the slot 14 formed thereby are relatively smooth in surface with relatively few irregularities therein for obtaining suitable aerodynamic performance during operation of the slot 14 in its intended film cooling environment.

The right portion of FIG. 6 illustrates schematically the formation of the first series of spots 28 in the first pass of the first beam 26a. The middle portion of FIG. 6 illustrates a subsequent pass of the first beam 26a in which the slot 14 is about half formed in depth. And the left side of FIG. 6 illustrates the slot 14 formed to its final desired depth d with the sidewalls thereof and the bottom surface being substantially smooth and uniform in dimension. As used herein, substantially smooth means that the peak to valley difference in height of adjacent portions of the slot sidewalls and bottom are within the exemplary range of about 1–5 mils.

The resultant slot 14 illustrated in FIG. 6 extends in depth d only partly below the first surface 12a, with the slot depth d being suitably less than the thickness T of the component 12, with the remaining metal below the bottom of the slot 14 and above the component second surface 12b defining a base 30 having a thickness t extending upwardly from the second surface 12b. Since the bottom of the slot 14 may be accurately laser formed in accordance with the present invention with a relatively smooth surface and with a substantially uniform depth d, the remaining base 30 has a corresponding relatively uniform thickness t for ensuring acceptable strength of the component 12 for accommodating various structural and thermal loads during operation. The relatively smooth surfaces of the slot 14 also reduce the corresponding stress concentrations thereat for further ensuring effective useful life of the component 12 during operation in its intended environment.

In an exemplary embodiment, the diameter D of the first beam 26a and the corresponding spot 28 may be in the exemplary range of 20–40 mils, with the resulting width W and depth d of the slot 14 being substantially equal to each other in the corresponding range of 20–40 mils as illustrated in FIG. 3. The laser 14 in the exemplary form of the Nd:YAG laser may be operated with a conventional average power in the range of about 40–400 watts, with a preferred pulse rate in accordance with the present invention in the preferred range of about 10–100 Hz, and with a pulse duration in the conventional range of about 0.2–1.0 milliseconds (ms). And, the machine 10 may be conventionally operated for traversing the component 12 relative to the stationary laser 24 so that the first laser beam 26a is traversed at a feed rate in the preferred range of about 50–100 inches/minute in accordance with the present invention to form the slot 14 in a series of passes in the range of about 4–10 passes.

The slot depth d may have any suitable value up to about 200 mils for example. The 200 mil slot depth compared to the 40 mil slot depth will correspondingly require a greater number of passes for the laser machining thereof which is roughly five times the number of passes needed for the 40 mil deep slot.

For a given spot diameter D, the specific pulse rate and feed rate may be suitably selected to ensure that successive spots 28 do not substantially overlap each other, and are preferably spaced apart from each other. Experience will dictate the amount of overlap of successive spot 28 which may be obtained without unacceptably concentrating the laser beam pulse energy at individual locations which would lead to an undesirable enlargement in the width W of the slot 14 greater than the nominal diameter D of the first laser beam 26a and the corresponding slot 28, and without undesirable variation in the depth d of the slot 14 which would degrade aerodynamic performance, and/or result in an insufficient thickness t of the base 30 for structural reasons. It is theorized that overlap of successive spots 28 may be acceptable up to about 25% overlap. However, in the preferred embodiment of the present invention, substantially no overlap is desired with a suitable spacing between successive spots 28 being effected for suitably spreading the pulse energy from the first laser beam 26a along the length of the slot 14 in each successive traversing pass.

In accordance with another feature of the present invention the same laser 24 is preferably operated in a suitable drilling mode to create a second laser beam 26b illustrated schematically in FIG. 6 for drilling the through holes 16 in an otherwise conventional laser drilling process. In accordance with the present invention, the same machine 10 illustrated in FIG. 1 suitably repositions the same component 12 for drilling the holes 14 therein using the same fixture 22 in turn following formation of the slot 14. Since the component 12 need not be disassembled from its fixture 22 or the machine 10 following the slot forming process, the component 12 enjoys the same reference position in the machine 10 with any fixturing positional errors being identical for both the slot forming process and the hole drilling process for ensuring more accurate alignment between the holes 16 in the corresponding slot 14. If the slot 14 and hole 16 were formed using two different manufacturing processes with correspondingly different tooling, critical and precise alignment between the separate manufacturing steps would be required to ensure accurate alignment of the holes 16 in the slot 14. And, the use of precision sensing equipment to locate the slot 14 for in turn properly locating the drilling location of the holes 16 therein would most likely also be required. These additional complexities inherent in the use of different conventional processes for separately forming the slots 14 and the holes 16 are therefore eliminated in accordance with the present invention which uses the same machine 10, fixture 22, and laser 24 in two successive operating steps for separately forming the slots 14 followed in turn by drilling the holes 16 therein.

To initiate the drilling process, the machine 10 suitably positions the fixture 22 including the component 12 supported therein into the required position and orientation relative to the laser 24 so that the second laser beam 26b, as illustrated in FIG. 6 for example, is suitably aligned in the previously formed slot 14 to laser drill the through hole 16 through the base 30 between the slot 14 and the component second surface 12b. For drilling each of the holes 16, the component 12 remains stationary relative to the laser 24 and the laser 24 may be conventionally operated for laser drilling the holes 16 at any desired inclination angle through the base 30. In the exemplary embodiment where the laser 24 is a Nd:YAG laser, it may be conventionally reconfigured for laser drilling as compared to forming the slots 14 described above, by setting its variable parameters to obtain an average power in the range of about 40–400 watts, with a pulse rate in the range of about 5–10 Hz, which is substantially less than the pulse rate used above for the slot forming operation, and with a pulse duration in the range of about 0.2–2.0 ms.

As each hole 16 is completed, the machine 10 repositions the component 12 so that the second laser beam 26b is repositioned in the slot 14 to drill in turn the required number of through holes 16 in each of the slots 14. A suitable plurality of the holes 16 are spaced apart from each other along the slot length as desired for suitably feeding the slot 14 with the cooling air 20 during engine operation. In a preferred embodiment, the depth d of the slot 14 is about twice the diameter of the hole 16.

As shown in FIG. 6, the slot 14 is initially formed using the first laser beam 26a with the corresponding operating parameters thereof including the desired pulse rate and feed rate for suitably longitudinally spreading the pulse energy from spot to spot to accurately form the resulting slot 14 in width W and depth d, with a suitably smooth surface configuration thereof. The same laser 24 may then be reconfigured with suitably changed operating parameters in a conventional combination thereof including the relatively slow pulse rate of about 5–10 Hz to laser drill each of the required holes 16 in turn for each corresponding slot 14.

In the exemplary embodiment illustrated in FIGS. 3 and 6, the first laser beam 26a is preferably directed substantially perpendicularly to the first surface 12a to form a single slot 14 having a generally U-shaped cross-section. As shown in FIG. 3, the sidewalls of the laser-formed slot 14 automatically forms small radii with the bottom of the slot 14 which is desirable for reducing stress concentrations thereat.

Figure 7:
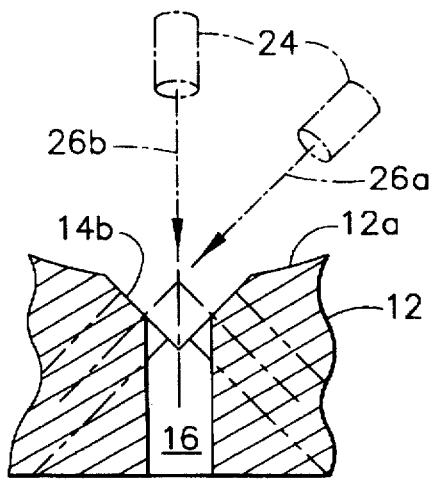
FIG. 7 is a cross-sectional view through a slot and through hole in accordance with a second embodiment of the present invention.

Illustrated in FIG. 7 is a second embodiment of the laser formed slot designated 14b which may be obtained by directing the first laser beam 26a at an acute angle relative to the first surface 12a to form a single slot 14b having a generally V-shaped cross-section. The through holes 16 may be subsequently formed by directing the second laser beam 26b downwardly through the apex of the V-slot 14b in one exemplary configuration. The holes 16 may alternatively be positioned through either face of the V-shaped slot 14b if desired.

Figure 8:
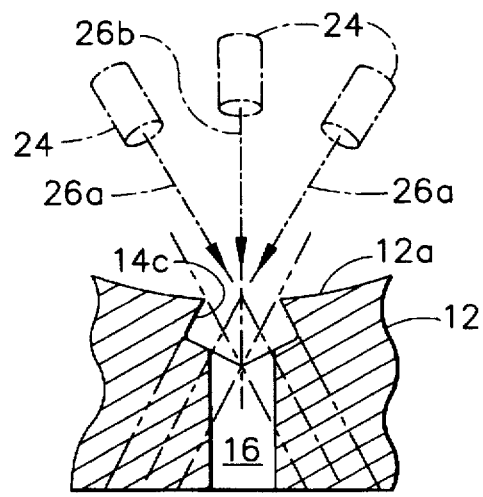
FIG. 8 is a cross-sectional view through a slot and through hole in accordance with a third embodiment of the present invention.

Illustrated in FIG. 8 is a third embodiment of the laser formed slot designated 14c wherein the first laser beam 26a is directed at a first acute angle to the first surface 12a in one pass series, and then at an opposite second acute angle to the first surface 12a in another pass series to form two respective U-shaped slots intersecting together without a common wall therebetween to define the collective slot 14c having a collective obtuse angled bottom. In this embodiment, the second laser beam 26b may be subsequently used to laser drill the holes 16 at the apex or center of the adjoining bottom portions of the slot bottom, or in either portion thereof as desired. In the third embodiment illustrated in FIG. 8, the opening of the slot 14c at the first surface 12a is narrower than its midsection for initially confining the flow of cooling air therein prior to discharge therefrom as a continuous cooling air film.

Figure 9:
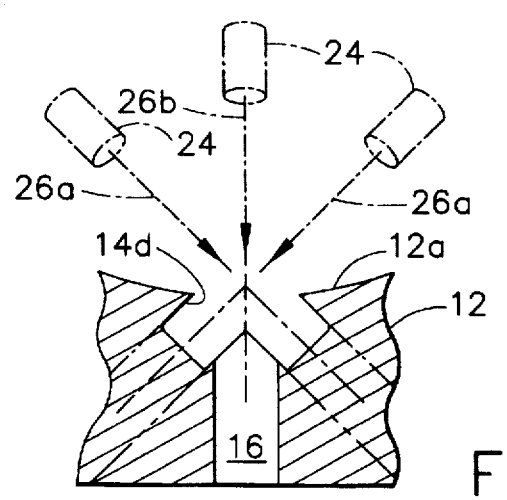
FIG. 9 is a cross-sectional view through a slot and through hole in accordance with a fourth embodiment of the present invention.

Illustrated in FIG. 9 is a fourth embodiment of the slot designated 14d which is initially similar to the embodiment illustrated in FIG. 8 wherein the first laser beam 26a is directed at a first acute angle to the first surface 12a in one pass series, and at an opposite second acute angle to the first surface 12a in another pass series to form two respective U-shaped slots intersecting together, at about 90° for example, to collectively define the common slot 14d having a W-shaped bottom. In this embodiment also, the opening of the slot 14d at the first surface 12a is narrower than the midportion of the slot 14d, and the through holes 16 may be suitably formed using the second laser beam 26b downwardly through the apex or middle of the W-shaped bottom of the slot 14d. Alternatively, the through holes 16 may be formed in either or both of the two intersecting legs of the slot 14d if desired.

As indicated above, a film cooling slot 14 and its corresponding plurality of air feeding through holes 16 may be quickly and accurately laser machined in turn in the same machine tool without refixturing of the component 12 for ensuring accurate alignment of the holes 16 in the corresponding slot 14, and with suitably smooth sidewalls and bottom of the slot 14. The cost of laser forming the slot and holes is therefore correspondingly reduced compared to conventional EDM machining of the slots and holes, or EDM machining of the slots with corresponding laser drilling of the holes, which can significantly reduce cost of manufacturing the various components typically found in a gas turbine engine requiring film cooling which may use the cooperating slots and through holes disclosed herein.

Although the laser 24 is preferably a conventional Nd:YAG solid state laser operated in accordance with the present invention as described above, it may take other conventional forms suitably operated for spreading the laser energy along the slot length during the formation thereof. Other conventional lasers include carbon dioxide, excimer, copper vapor, and glass.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A method for forming a slot in a metal component having first and second opposite surfaces spaced apart at a thickness, comprising the steps of:

effecting a first laser beam having a pulse rate and power to vaporize said metal;

traversing said first laser beam across said first surface at a feed rate so that each beam pulse vaporizes said metal at a spot; and said pulse rate and feed rate being effective so that successive spots do not substantially overlap each other; and repeating said traversing step in a series of passes so that said spots collectively form a continuous blind slot in said metal component to a depth below said first surface and having a width, and a length greater than said width.

2. A method according to claim 1 wherein said slot extends in depth partly below said first surface and defines with said second surface a base having a thickness extending upwardly from said second surface.

3. A method according to claim 2 wherein said first laser beam is directed perpendicularly to said first surface to form a single slot having a generally U-shaped cross-section.

4. A method according to claim 2 wherein said first laser beam is directed at an acute angle to said first surface to form a single slot having a generally V-shaped cross-section.

5. A method according to claim 2 wherein said first laser beam is directed at a first acute angle to said first surface in one pass, and at an opposite second acute angle to said first surface in another pass to form respective U-shaped slots intersecting together without a common wall therebetween, and having a collective obtuse angled bottom.

6. A method according to claim 2 wherein said first laser beam is directed at a first acute angle to said first surface in one pass, and at an opposite second acute angle to said first surface in another pass to form respective U-shaped slots at about 90° therebetween to define a collective W-shaped bottom.

7. A method according to claim 2 further comprising:

effecting a second laser beam having power to vaporize said metal;

positioning said second laser beam in said slot to drill a through hole through said base between said slot and said second surface; and repositioning said second laser beam in said slot to drill a plurality of said through holes spaced apart from each other along said slot length.

8. A method according to claim 7 wherein:

said component is fixedly supported in a fixture in a multi-axis machine for positioning said component relative to a laser;

said laser is operated to effect said first laser beam; and said machine moves said component for traversing said first laser beam relative thereto to form said slot.

9. A method according to claim 8 wherein:

said machine repositions said component for drilling said holes using the same fixture in turn following formation of said slot; and said laser is operated to effect said second laser beam to drill said holes.

10. A method according to claim 9 wherein:

said component is a hollow gas turbine engine turbine airfoil, said slot is a film cooling slot, and said holes are disposed in flow communication between said slot and an interior channel of said airfoil for channeling film cooling air into said slot and in turn as a film from said slot; and said laser is a Nd:YAG laser configured:

for producing said first laser beam with an average power in the range of about 40–400 watts, a pulse rate in the range of about 10–100 Hz, and a pulse duration in the range of about 0.2–1.0 milliseconds, and said first laser beam is traversed at a feed rate in the range of about 50–100 inches per minute to form said slot; and for producing said second laser beam with an average power in the range of about 40–400 watts, a pulse rate in the range of about 5–10 Hz, and a pulse duration in the range of about 0.2–2.0 milliseconds to drill said holes.

11. A method according to claim 9 wherein:

said component is a hollow gas turbine engine turbine airfoil, said slot is a film cooling slot, and said holes are disposed in flow communication between said slot and an interior channel of said airfoil for channeling film cooling air into said slot and in turn as a film from said slot; and said laser is a Nd:YAG laser configured for producing said first and second laser beams with an average power in the same range, a pulse rate in a lower frequency range for the second laser beam, and a pulse duration in a larger range for the second laser beam.

12. A method according to claim 2 wherein said traversing step is repeated to form said base with uniform thickness.

13. A method according to claim 1 wherein said successive spots in each of said traversing steps are spaced apart from each other and do not overlap.

14. A method according to claim 1 wherein said traversing step is repeated to form said slot with said slot depth substantially equal to said slot width.

15. A method according to claim 1 wherein said laser beam has a diameter at said first surface at said spot, and said traversing step is repeated to form said slot width substantially equal to said beam diameter.

16. A method according to claim 1 wherein said traversing step is repeated to form a straight slot.

17. A method according to claim 1 further comprising laser drilling through said slot a plurality of holes through said slot base upon completion of said slot in two successive slotting and drilling operations.

18. A method according to claim 17 further comprising reconfiguring said first laser beam into a different second laser beam to perform said drilling operation upon completion of said slotting operation.

19. A method according to claim 18 further comprising directing said first and second laser beams at different angles to said first surface in said corresponding slotting and drilling operations.

20. A method according to claim 1 wherein said traversing step is repeated to form said slot with a substantially smooth bottom and uniform depth.

* * * * *